March 19, 1940. W. A. JEX 2,194,228
ONE-WAY CLUTCH
Filed May 16, 1938
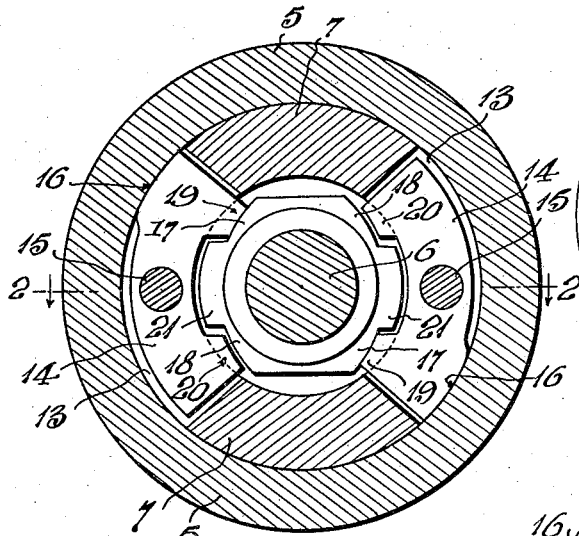
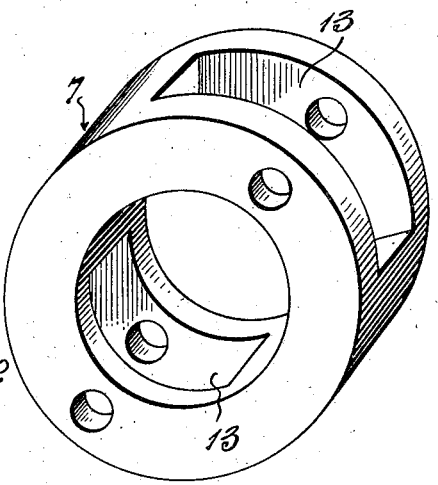
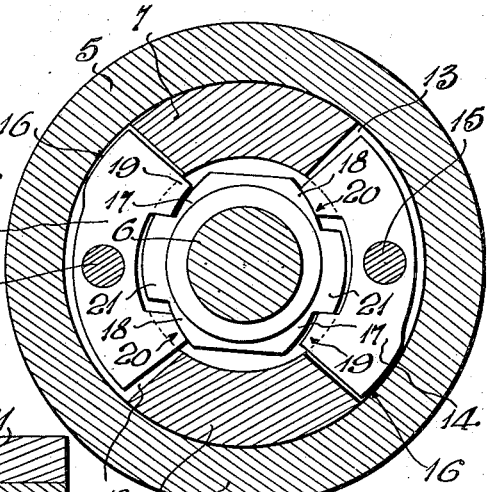
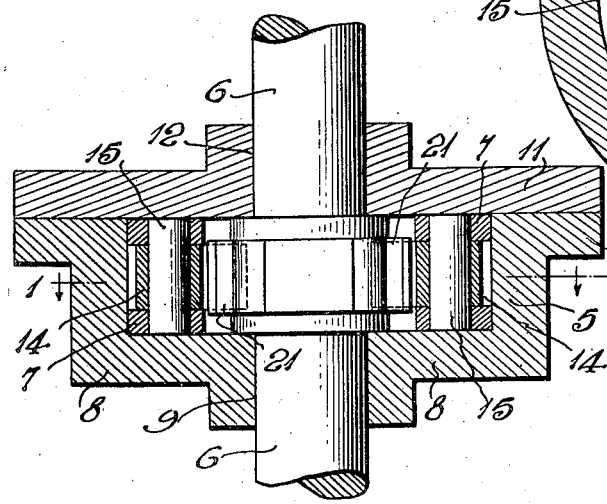
Inventor
William A. Jex
Attorneys Patented Mar. 19, 1940

2,194,228

UNITED STATES PATENT OFFICE 2,194,228

ONE-WAY CLUTCH

William A. Jex, Somerville, Mass.

Application May 16, 1938, Serial No. 208,264

6 Claims. (Cl. 192—41)

The invention relates to one-way clutches of the general type in which a movable clutch element coacts with a circular wall, becoming locked with said wall when slight relative rotation of parts occurs in one direction, and becoming unlocked when reverse relative rotation occurs. For purposes of description, the circular wall may be considered as rotatably mounted, as in a one-way drive mechanism, and the shaft may either constitute a driver for the wall, or said wall may constitute a driver for the shaft. Moreover, by fixing one of the relatively rotatable members (shaft and wall) and mounting the other member to rotate, the same structure may be used to allow said rotation in but one direction, for example, to prevent an automobile from drifting rearwardly downhill.

The object of the invention is to provide an exceptionally simple and inexpensive, yet an efficient and reliable construction for attaining the desired end, and with this object in view, the invention resides in the novel subject matter hereinafter described and claimed, description being accomplished by reference to the accompanying drawing.

Fig. 1 is a transverse sectional view on line 1—1 of Fig. 2, showing the clutch levers operatively engaged with the circular wall with which they coact.

Fig. 2 is a longitudinal sectional view substantially on line 2—2 of Fig. 1.

Fig. 3 is a view similar to Fig. 1 but showing the clutch levers released from the circular wall.

Fig. 4 is a perspective view of the carrier ring upon which the clutch levers are fulcrumed.

A preferred construction has been shown and will be rather specifically described, with the understanding, however, that within the scope of the invention as claimed, variations may be made.

The numerals 5 and 6 denote the circular wall and the shaft mounted for relative rotation in coaxial relation with each other, and 7 has reference to a floating carrier coaxial with said wall and shaft. The wall 5 is preferably part of a cup-shaped member 8 having a central bearing 9 through which the shaft 6 passes rotatably, the edge of said wall 5 at the cup rim being secured to a disk 11, said disk having a central bearing 12 for said shaft 6.

The carrier 7 in the present disclosure is in the form of a ring having running contact with the inner peripheral face of the annular wall 5, said ring having one or more arcuate recesses 13 according to the number of clutch levers 14 to be embodied in the structure. In the present instance, there are two levers 14 and the recesses 13 which receive them are diametrically opposite each other, said recesses opening through both the inner and the outer peripheries of said ring.

The levers 14 extend substantially circumferentially of the carrier 7 and they are preferably of the arcuate form illustrated in the drawing, the fulcrums 15 which connect said levers with the carrier 7 being disposed about centrally between the ends of said levers in parallel relation with the shaft 6 and in one plane extending diametrically through the shaft axis. One of the levers 14 is disposed entirely at one side of a second plane extending diametrically through the shaft axis, and the other of said levers is disposed entirely at the other side of this plane. One end of each lever is provided with a friction surface 16 fixedly carried thereby for contact with the wall 5, the two friction surfaces 16 being disposed across a line which extends diametrically through the shaft axis between the two aforesaid planes. The shaft 6 is provided with a cam 17 for each lever, said cam being active upon relative rotation of said shaft and the wall 5 in one direction, to tightly force the friction surface 16 against said wall. The shaft 6 is also provided with another cam 18 for each lever 14 to swing the latter and release its friction surface 16 from the wall 5 when reverse relative rotation of said shaft and wall occurs. The cams 17 and 18 for one lever are both disposed at one side of the aforesaid one diametrical plane, and said cams for the other lever are disposed at the other side of this plane. The cam 17 directly coacts with the end of the lever 14 having a friction surface 16, and the cam 18 directly coacts with the opposite end of said lever, said lever ends being provided, in the present disclosure, with lugs 19 and 20 projecting inwardly from its inner edge for engagement with said cams 17 and 18 respectively.

Provision is made to limit the turning of the shaft 6 with respect to the lever or levers 14 in such direction as to release said levers from engagement with the wall 5. In the present showing, this means is formed partially by the lugs 19 of the levers 14 and partially by additional lugs 21 projecting from the shaft 6. The lugs 21 are received between the lugs 19 and 20 and are suitably spaced therefrom to permit the necessary relative turning of the parts. Upon relative turning of parts in such direction as to rock the levers 14 and hold the friction surfaces 16 against the wall 5, the lugs 21 never come in contact with the lugs 20. However, upon reverse relative rotation to rock the levers 14 and release the friction surfaces 16 from the wall 5, said lugs 21 strike the lugs 19, preventing the cams 18 from possibly swinging said levers so far as to engage the ends thereof opposite the surfaces 16, with the wall 5. As soon as the levers are released from the wall and the lugs 21 strike the lugs 19, the shaft 6, carrier 7 and levers 14 may rotate unitarily, or may unitarily remain relatively stationary as the wall 5 rotates about them, as the case may be.

From the foregoing taken in connection with the accompanying drawing, it will be seen that novel and advantageous provision has been made for carrying out the desired end, and while two levers and a proper number of cams and lugs have been shown, it will be understood that one lever with its cooperating cams and lugs, or more than two levers with the necessary lugs and cams, could be employed. In any instance, the slightest relative rotation of shaft and wall in one direction effects tight engagement of each friction surface 16 with said wall, whereas the slightest relative rotation in the opposite direction effects release of said friction surface from said wall. When each surface 16 is in contact with the wall 5, a direct connection is established between the wall 5 and the shaft 6 but when each lever 14 occupies the position of Fig. 3, said shaft and wall are entirely freed from connection with each other, for relative rotation.

I claim:

1. A device of the class described comprising a circular wall and a shaft mounted for relative rotation, a floating carrier mounted coaxially with said wall and shaft, a lever extending substantially circumferentially of said carrier and fulcrumed between its ends thereto, the outer peripheral edge of said lever being provided at one end with a friction surface fixedly carried thereby for contact with said wall, the inner edge of said lever being provided with two lugs disposed at the ends of said lever respectively, two cams on said shaft cooperable with said lugs respectively, one of said cams being active to rock said lever and hold said friction surface engaged with said wall upon slight relative turning of said shaft and wall in one direction, the second cam being operative to reversely rock said lever and release said friction surface from engagement with said wall upon reverse relative rotation of said shaft and wall, and a third lug on said shaft and received between said lever lugs, said third lug being cooperable with one of said lever lugs to so limit relative turning of said shaft and lever as to limit the movement imparted to said lever by said second cam.

2. A device of the class described comprising a circular wall and a shaft mounted for relative rotation, a circular floating carrier mounted coaxially with said wall and shaft and having circumferentially spaced circumferentially elongated openings from its inner periphery to its outer periphery, levers extending substantially circumferentially of said carrier within said openings and fulcrumed between their ends to said carrier, the outer peripheral edge of each lever being provided at one end with a friction surface fixedly carried thereby for contact with said wall, the inner edge of each lever being provided with two lugs disposed at the ends of said lever respectively and projecting toward said shaft, and cams on said shaft cooperable with the inner shaft-facing ends of the lever lugs, some of said cams being active to rock said levers and hold their friction surfaces engaged with said wall upon slight relative turning of said shaft and wall in one direction, the others of said cams being operative to reversely rock said levers to release said friction surfaces from engagement with said wall upon reverse relative rotation of said shaft and wall.

3. In a friction clutch of the type which is automatically engaged upon relative rotation of parts in one direction and automatically released upon relative rotation of said parts in the other direction; a circular wall, a shaft and a floating carrier mounted coaxially for relative rotation, two levers fulcrumed on said carrier, the fulcrums of said levers being parallel with the axis of said shaft and disposed in one plane extending diametrically through the shaft axis, one of said levers being disposed entirely at one side of a second plane which extends diametrically through said shaft axis and intersects said one plane, the other of said levers being disposed entirely at the other side of said second plane, one end of each of said levers being provided at its outer edge with a curved clutch surface fixedly carried thereby for fitting engagement with the inner side of said wall, the two clutch surfaces of the two levers being disposed across a line extending diametrically through said shaft axis between said first and second planes two cams on said shaft at said one side of said second plane and disposed at the inner edge of said one of said levers to coact with opposite ends of this lever in rocking the same to and from wall-engaging position, and two additional cams on said shaft at said other side of said second plane and disposed at the inner edge of said other of said levers to coact with opposite ends of this lever in rocking it to and from wall-engaging position.

4. A structure as specified in claim 3; said carrier being of circular form and having openings from its inner periphery to its outer periphery in which said levers are received.

5. A device of the class described comprising a circular wall and a shaft mounted for relative rotation, a floating carrier mounted coaxially with said wall and shaft, a lever extending substantially circumferentially of said carrier and fulcrumed between its ends thereto, the outer peripheral edge of said lever being provided at one end with a friction surface fixedly carried thereby for contact with said wall, the inner edge of said lever being provided with two lugs disposed at the ends of said lever respectively, and two cams on said shaft cooperable with said lugs respectively, one of said cams being active to rock said lever and hold said friction surface engaged with said wall upon slight relative turning of said shaft and wall in one direction, the second cam being operative to reversely rock said lever and release said friction surface from engagement with said wall upon reverse relative rotation of said shaft and wall, said lugs extending inwardly from the inner edge of said lever toward said cams for cooperation with the latter.

6. A structure as specified in claim 3; the inner edges of said levers having lugs at their ends extending toward said cams for cooperation therewith.

WILLIAM A. JEX.